United States Patent
Konishi et al.

(10) Patent No.: US 11,306,773 B2
(45) Date of Patent: Apr. 19, 2022

(54) WHEEL BEARING DEVICE

(71) Applicant: NTN CORPORATION, Osaka (JP)

(72) Inventors: Ryo Konishi, Iwata (JP); Tsukasa Watanabe, Iwata (JP)

(73) Assignee: NTN CORPORATION, Osaka (JP)

( * ) Notice: Subject to any disclaimer, the term of this patent is extended or adjusted under 35 U.S.C. 154(b) by 508 days.

(21) Appl. No.: 16/332,576

(22) PCT Filed: Sep. 8, 2017

(86) PCT No.: PCT/JP2017/032560
§ 371 (c)(1),
(2) Date: Mar. 12, 2019

(87) PCT Pub. No.: WO2018/051927
PCT Pub. Date: Mar. 22, 2018

(65) Prior Publication Data
US 2021/0324909 A1    Oct. 21, 2021

(30) Foreign Application Priority Data
Sep. 14, 2016  (JP) .............................. JP2016-179828

(51) Int. Cl.
*F16C 19/18* (2006.01)
*F16C 33/78* (2006.01)

(52) U.S. Cl.
CPC ........ *F16C 19/183* (2013.01); *F16C 33/7823* (2013.01); *F16C 2326/02* (2013.01)

(58) Field of Classification Search
CPC .. F16C 19/183; F16C 19/186; F16C 33/7823; F16C 33/7826; F16C 33/7879;
(Continued)

(56) References Cited

U.S. PATENT DOCUMENTS 10,119,571 B2    11/2018    Seno et al.
2013/0127119 A1    5/2013    Haepp et al.
(Continued)

FOREIGN PATENT DOCUMENTS

CN    103052819    4/2013
DE    102014203210 A1 *  8/2015  .......... F16C 33/7886
(Continued)

OTHER PUBLICATIONS

Chinese Office Action dated Mar. 2, 2020 in corresponding Chinese Patent Application No. 201780055057.3 with English translation.
(Continued)

*Primary Examiner* — Phillip A Johnson
(74) *Attorney, Agent, or Firm* — Wenderoth, Lind & Ponack, L.L.P.

(57) ABSTRACT

A wheel bearing device (1) provided with an outer sealing member (7) in which: a core metal (8) having formed therein multiple seal lips is fitted to the outer opening of an outer ring (2); a metal ring (9) is fitted to the outer peripheral section of a hub ring (3) so as to oppose the core metal. The multiple seal lips are brought into contact with the metal ring, so that a portion between the outer ring and the hub ring is sealed. An annular outer member side weir part (11*f*) that protrudes to the outer side, in a radial direction, as compared to the outer edge of the metal ring so as to surround the metal ring is provided to the core metal, and an outer member side expanded-diameter part (8*g*) that holds grease is formed in the inner peripheral surface of the outer member side weir part.

14 Claims, 11 Drawing Sheets

(58) Field of Classification Search
CPC .............. F16C 33/7883; F16C 33/7886; F16C 2326/02; B60B 27/0073
See application file for complete search history.

(56) References Cited

U.S. PATENT DOCUMENTS

| | | | |
|---|---|---|---|
| 2016/0003302 A1* | 1/2016 | Seno | F16C 33/7886 277/351 |
| 2016/0178010 A1 | 6/2016 | Kaiser et al. | |
| 2018/0066711 A1* | 3/2018 | Wakabayashi | F16C 33/7876 |

FOREIGN PATENT DOCUMENTS

| | | | | |
|---|---|---|---|---|
| DE | 102016211561 A1 * | 12/2017 | ............. | F16J 15/164 |
| JP | 05-022852 | 3/1993 | | |
| JP | 2009-222183 | 10/2009 | | |
| JP | 2012-154374 | 8/2012 | | |
| JP | 2012154374 A * | 8/2012 | .......... | F16C 33/7876 |
| JP | 2016-014407 | 1/2016 | | |

OTHER PUBLICATIONS

International Search Report dated Oct. 10, 2017 in International (PCT) Application No. PCT/JP2017/032560.

\* cited by examiner

[FIG.1]
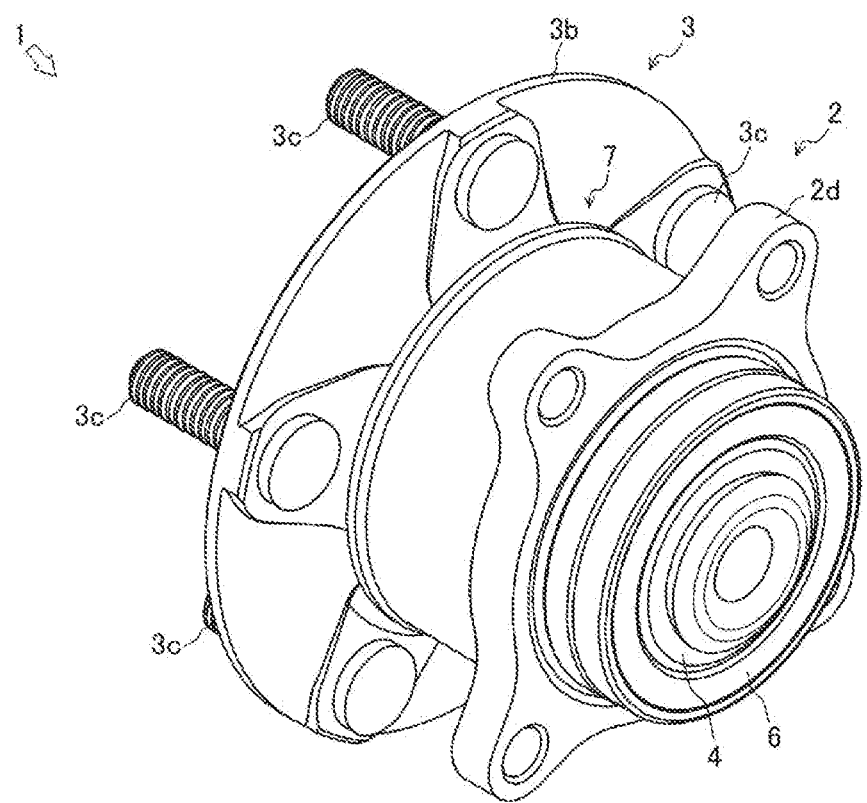

[FIG.2]
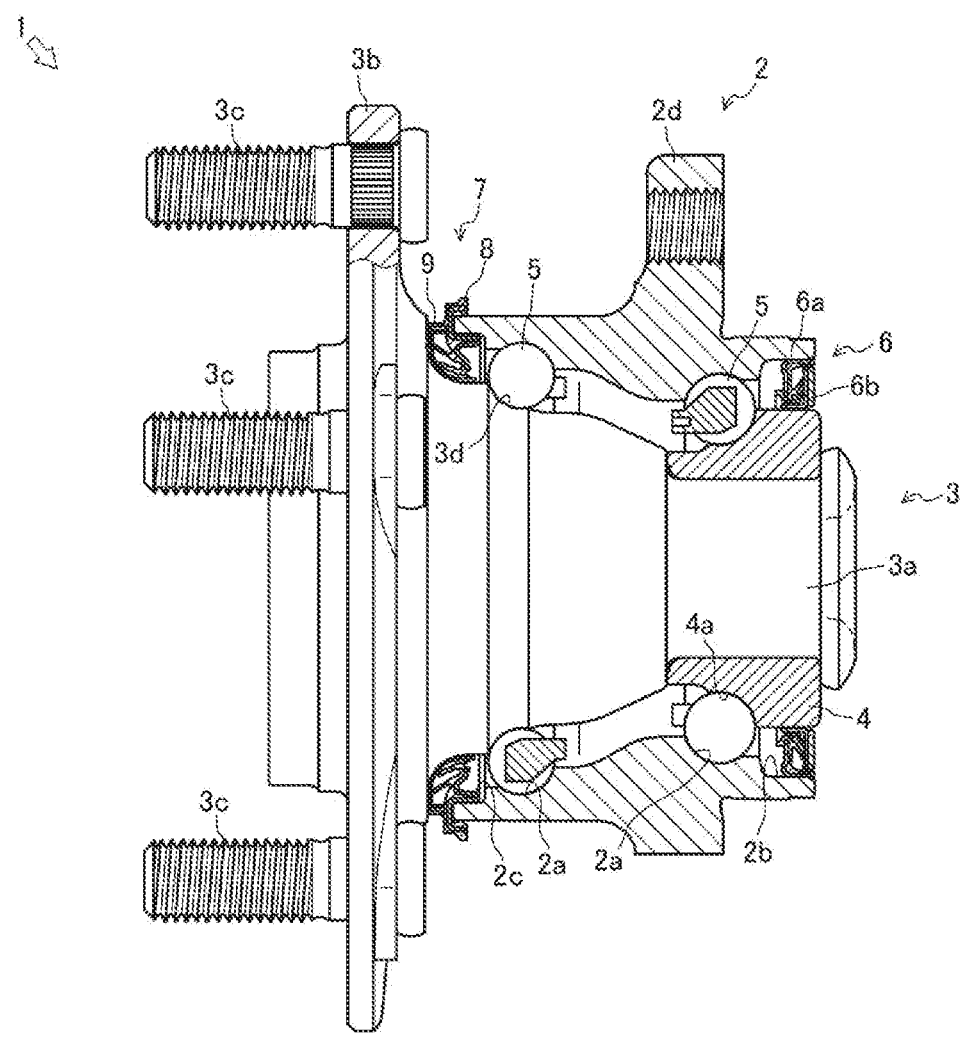

[FIG.3]
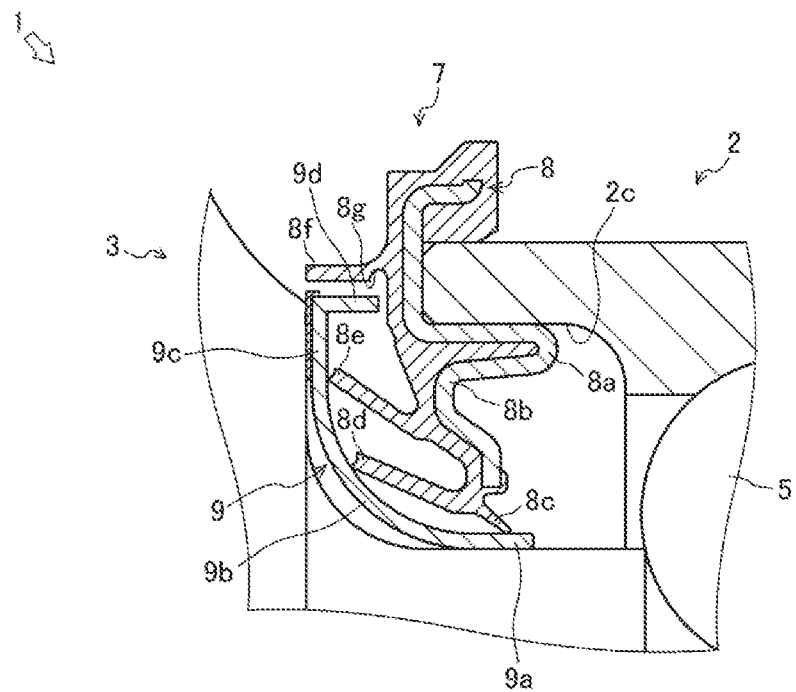
[FIG.4A]
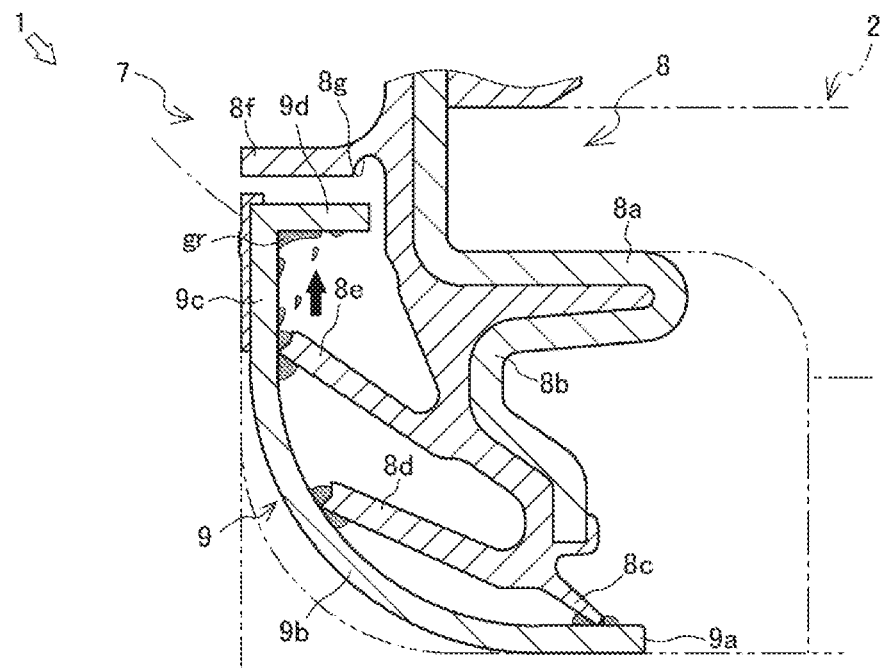

[FIG.4B]
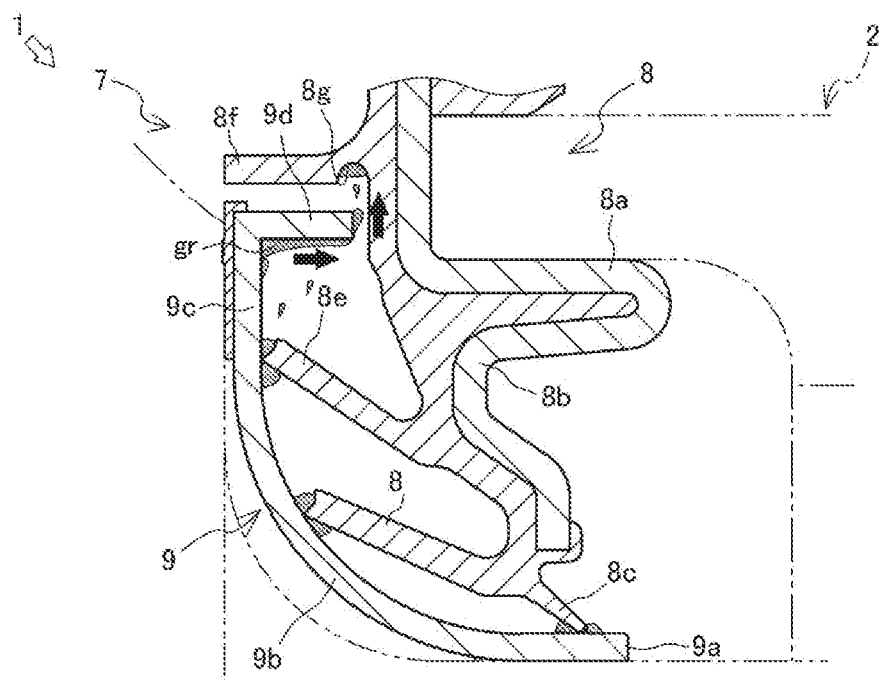

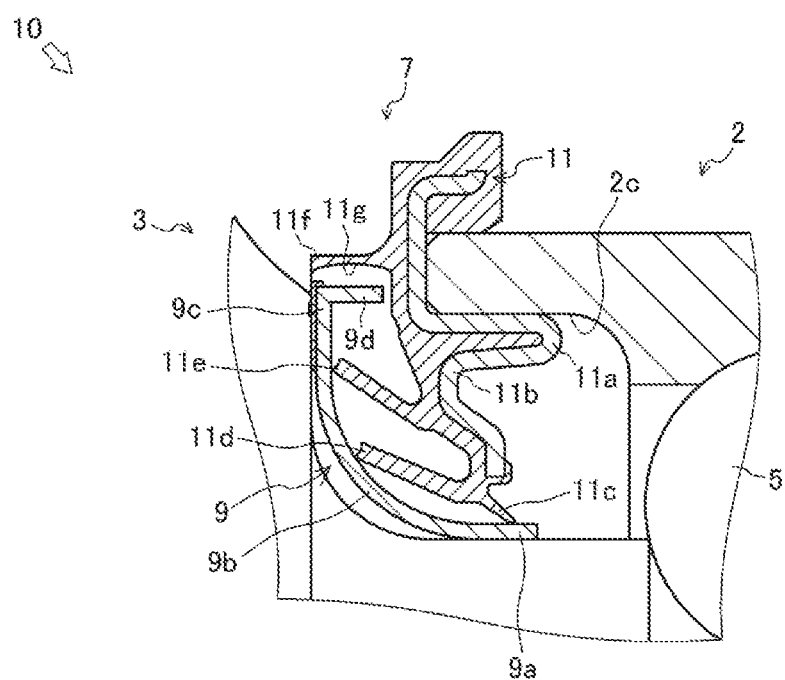
[FIG.5]

[FIG.6]
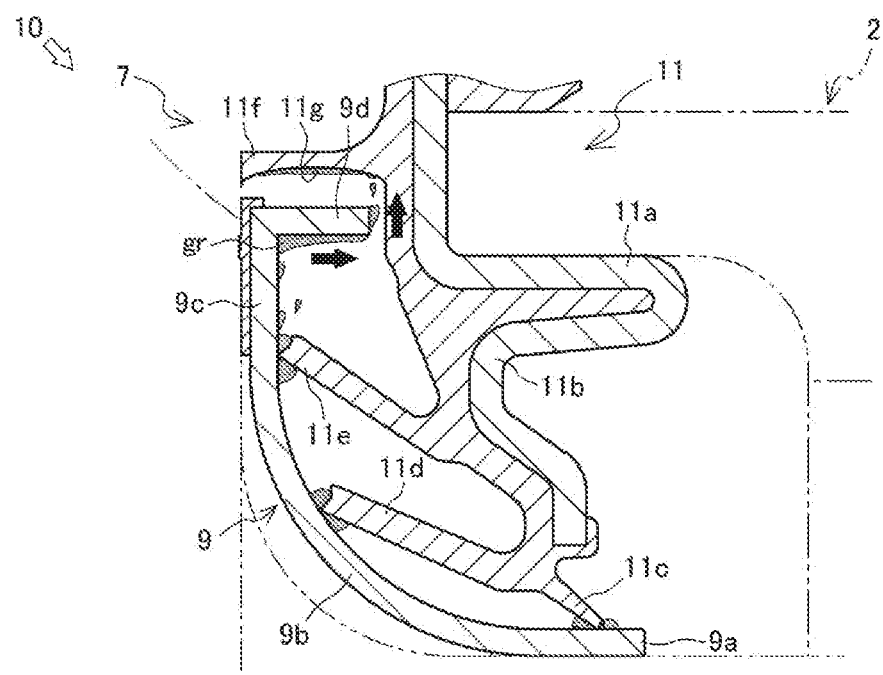

[FIG.7]
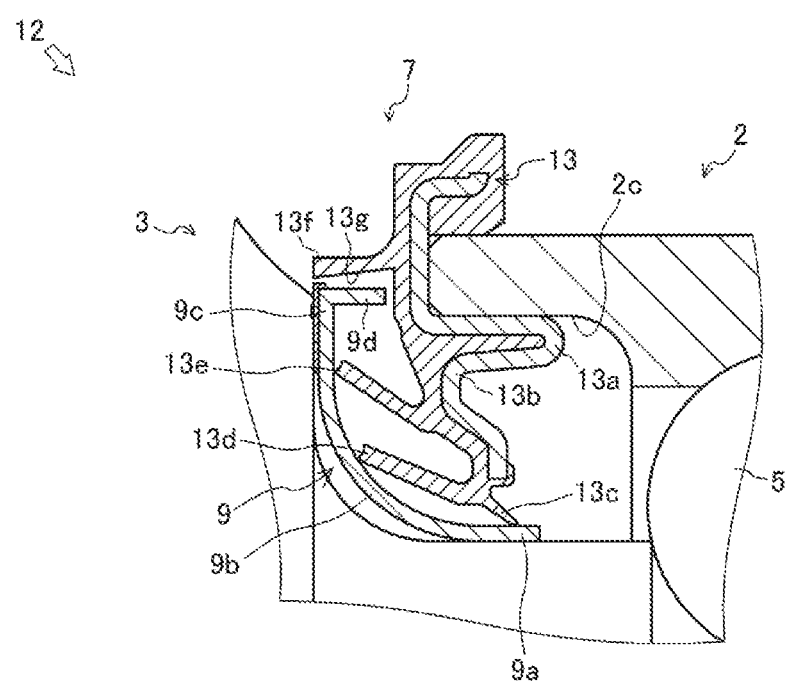

[FIG.8]
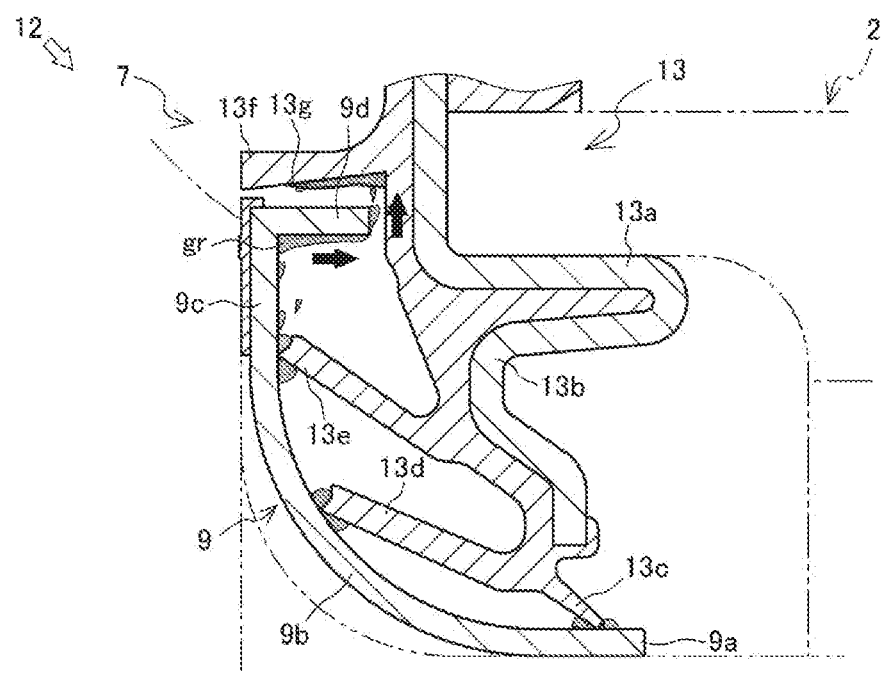

[FIG.9]
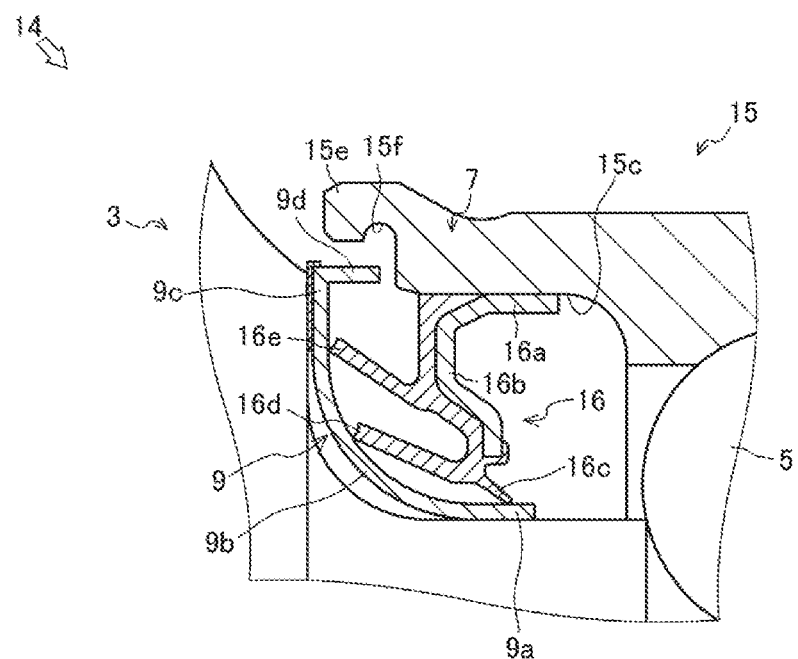

[FIG.10]
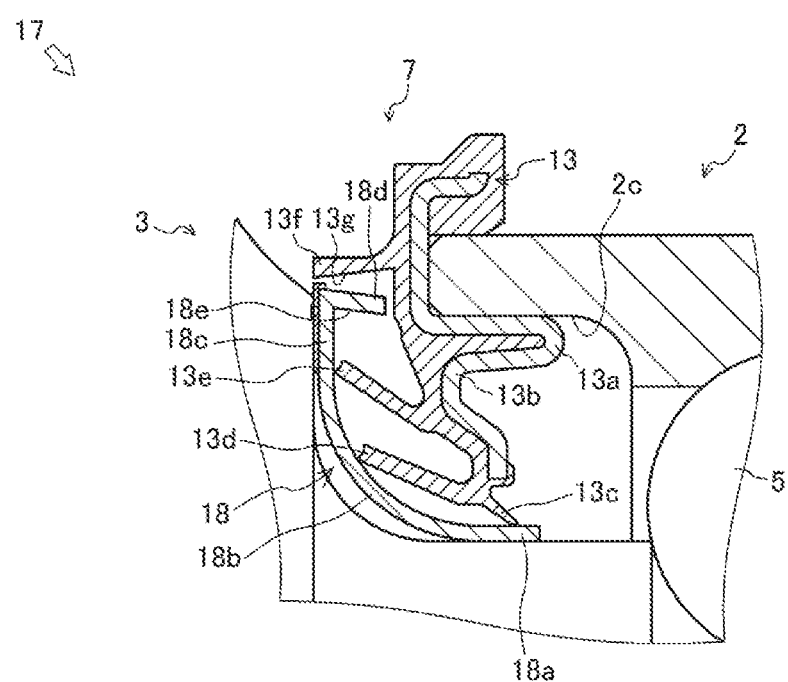

[FIG.11]
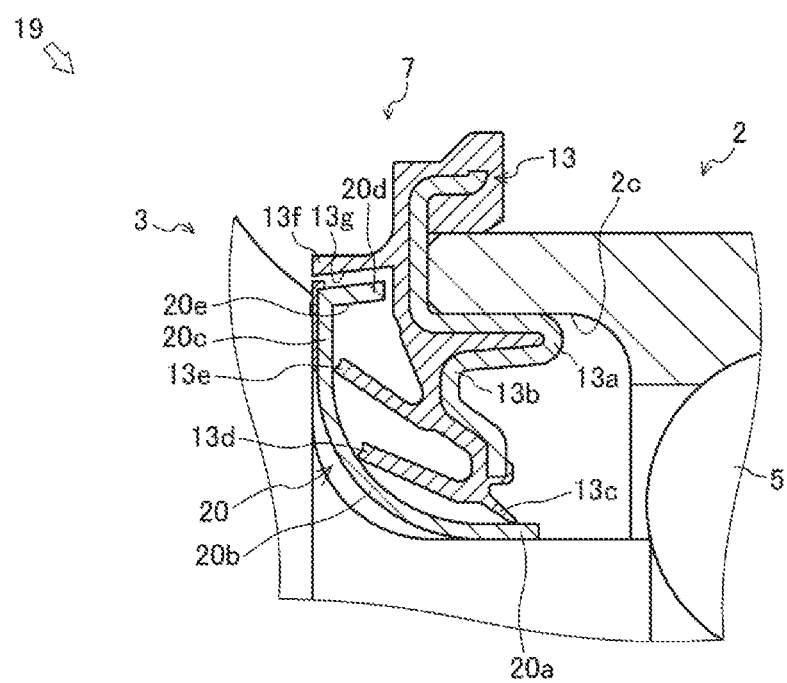

WHEEL BEARING DEVICE

TECHNICAL FIELD

The present invention relates to a wheel bearing device.

BACKGROUND ART

For use in a suspension system of an automobile, a wheel bearing device which rotatably supports a vehicle wheel has been known. In the wheel bearing device, a hub wheel connected to a vehicle wheel is rotatably supported via rolling elements. In the wheel bearing device, when grease inside an outer member decreases or rainwater or dust enters the outer member, the rolling elements and a raceway face of an inner member may be damaged to decrease the life of the bearing. For this reason, the wheel bearing device is provided with a seal member for preventing the filled grease from leaking from a gap between the outer member and the inner member, and preventing rainwater and dust from entering from the outside, on each of a knuckle-side (inner-side) and a hub wheel-side (outer-side).

To increase the life, some wheel bearing devices have a seal member provided with a plurality of seal mechanisms to improve the sealing performance. The seal member includes a labyrinth constituted by a plurality of seal lips. With such a configuration, the labyrinth of the seal member suppresses rainwater and dust from entering tips of the seal lips, preventing damage of the tips of the seal lips to increase the sealing performance. To maintain a good sealing performance, the seal member on the hub wheel-side is configured such that the seal lips are in contact with a metallic ring formed along the hub wheel. This is described in, for example, Patent Literature 1.

A bearing seal (seal member) on the flange-side (hub wheel-side) in a bearing device (wheel bearing device) described in Patent Literature 1 is configured of a seal body including a plurality of seal lips fixedly attached to a core metal and a weir portion that is located on the outermost diameter side and extends toward the flange-side, and a metallic ring fitted to a hub wheel of an inner wheel (inner member). An extension portion extending toward a vehicle body is formed at a radial outer end of the metallic ring. The weir portion of the seal body and the extension portion of the metallic ring radially overlap each other to constitute a labyrinth. With such a configuration, in the seal member on the flange-side (hub wheel-side), which includes the seal body and the metallic ring, grease is filled between the inner wheel and the outer wheel to prevent the intrusion of mud and foreign matters.

However, when the viscosity of grease lowers due to a temperature rise caused by the rotation of the bearing device, the grease applied to the seal lips may flow or scatter due to a centrifugal force. At this time, the bearing seal can receive the scattered grease by the weir portion of the seal body and the extension portion of the metallic ring. However, depending on the angle of the weir portion of the seal body and the extension portion of the metallic ring with respect to the radial direction, grease accumulated in the weir portion and the extension portion may flow out and scatter to the surroundings due to a centrifugal force.

CITATIONS LIST

Patent Literature

Patent Literature 1: JP-A 2016-14407 Gazette

SUMMARY OF INVENTION

Technical Problem

The present invention is devised in consideration of the above-mentioned circumstances, and intends to provide a wheel bearing device capable of suppressing flowing and scattering of a lubricant applied to seal lips to the outside.

Solutions to Problem

That is, a wheel bearing device includes: an outer member integrally provided with double-row outer rolling faces on an inner circumference of the outer member; an inner member including a hub wheel provided with an axially-extending narrowed stepped portion on an outer circumference of the hub wheel and at least one inner wheel press-fitted into the narrowed stepped portion, the inner member having double-row inner rolling faces opposed to the double-row outer rolling faces on an outer circumference of the inner member; double-row rolling elements rollably accommodated between the inner rolling faces and the outer rolling faces; and a seal member for sealing a space between the outer member and the inner member by fitting a core metal to an opening of the outer member, fitting a metallic ring to the outer circumference of the inner member so as to be opposed to the core metal, the core metal being provided with an elastic seal lip, and causing the metallic ring to contact the seal lip, wherein a ring-like outer member-side weir portion protruding further than an outer edge of the metallic ring in a radial outward direction to surround the metallic ring is provided with the core metal, and an outer member-side expanded portion for holding a lubricant is formed on an inner circumferential face of the outer member-side weir portion.

A wheel bearing device includes: an outer member integrally provided with double-row outer rolling faces on an inner circumference of the outer member; an inner member including a hub wheel provided with an axially-extending narrowed stepped portion on an outer circumference of the hub wheel and at least one inner wheel press-fitted into the narrowed stepped portion, the inner member having double-row inner rolling faces opposed to the double-row outer rolling faces on an outer circumference of the inner member; double-row rolling elements rollably accommodated between the inner rolling faces and the outer rolling faces; and a seal member for sealing a space between the outer member and the inner member by fitting a core metal to an opening of the outer member, fitting a metallic ring to the outer circumference of the inner member so as to be opposed to the core metal, the core metal being provided with an elastic seal lip, and causing the metallic ring to contact the seal lip, and in the wheel bearing device, a ring-like outer member-side weir portion protruding further than an outer edge of the metallic ring in a radial outward direction to surround the metallic ring is provided with the outer member, and an outer member-side expanded portion for holding a lubricant is formed on an inner circumferential face of the outer member-side weir portion.

In the wheel bearing device, the metallic ring is provided with a ring-like inner member-side weir portion protruding toward the outer member on a radial outer side of a contact position between the metallic ring and the seal lip.

In the wheel bearing device, an inner member-side expanded portion for holding the lubricant is formed on an inner circumferential face of the inner member-side weir portion.

The wheel bearing device is configured such that a tip of the inner member-side weir portion and the outer member-side expanded portion overlap each other in the radial direction.

In the wheel bearing device, at least one of the outer member-side expanded portion and the inner member-side expanded portion is formed in a ring-like groove.

In the wheel bearing device, at least one of the outer member-side expanded portion and the inner member-side expanded portion is formed in a ring-like concave curved face.

In the wheel bearing device, an inner diameter of at least one of the outer member-side weir portion and the inner member-side weir portion is gradually reduced toward its tip.

Advantageous Effects of Invention

The present invention achieves the following advantageous effects.

That is, in the wheel bearing device, even when the lubricant applied to the seal lip flows toward the outside, the lubricant is held in the outer member-side expanded portion. This can suppress the lubricant applied to the seal lip from flowing and scattering to the outside.

In the wheel bearing device, even when the lubricant applied to the seal lip flows toward the outside, the lubricant flows along the inner member-side weir portion, and is held by the inner member-side expanded portion or the outer member-side expanded portion. This can suppress the lubricant applied to the seal lip from flowing and scattering to the outside.

In the wheel bearing device, even when the lubricant applied to the seal lip flows toward the outside, the lubricant is guided by the inner member-side weir portion to the outer member-side expanded portion. This can suppress the lubricant applied to the seal lip from flowing and scattering to the outside.

In the wheel bearing device, even when the lubricant scatters in any radial direction due to a centrifugal force, the lubricant is held by at least one of the outer member-side expanded portion and the inner member-side expanded portion. This can suppress the lubricant applied to the seal lip from flowing and scattering to the outside.

BRIEF DESCRIPTION OF DRAWINGS

FIG. 1 is a perspective view illustrating an entire configuration of a wheel bearing device according to a first embodiment.

FIG. 2 is a sectional view illustrating the entire configuration of the wheel bearing device according to the first embodiment.

FIG. 3 is an enlarged sectional view illustrating an outer-side seal member of the wheel bearing device according to the first embodiment.

FIG. 4A is an enlarged sectional view illustrating the state where grease flowing outward in the radial direction due to a centrifugal force is received by an inner member-side weir portion in the wheel bearing device according to the first embodiment.

FIG. 4B is an enlarged sectional view illustrating the state where the grease received by the inner member-side weir portion is guided to an outer member-side expanded portion in the wheel bearing device according to the first embodiment.

FIG. 5 is an enlarged sectional view illustrating an outer-side seal member of a wheel bearing device according to a second embodiment.

FIG. 6 is an enlarged sectional view illustrating the state where the grease received by the inner member-side weir portion is guided to an outer member-side expanded portion in the wheel bearing device according to the second embodiment.

FIG. 7 is an enlarged sectional view illustrating an outer-side seal member of a wheel bearing device according to a third embodiment.

FIG. 8 is an enlarged sectional view illustrating the state where the grease received by the inner member-side weir portion is guided to an outer member-side expanded portion in the wheel bearing device according to the third embodiment.

FIG. 9 is an enlarged sectional view illustrating an outer member-side weir portion and an outer-side seal member of an outer member of a wheel bearing device according to a fourth embodiment.

FIG. 10 is an enlarged sectional view illustrating an outer-side seal member in which an expanded portion is provided on each of an inner member-side weir portion and an outer member-side weir portion of a wheel bearing device according to another embodiment.

FIG. 11 is an enlarged sectional view illustrating an outer-side seal member in which an inner circumferential face of an inner member-side weir portion is tapered to actively guide grease to an outer member-side weir portion of a wheel bearing device according to another embodiment.

DESCRIPTION OF EMBODIMENTS

With reference to FIG. 1 to FIG. 3, a wheel bearing device 1 that is a wheel bearing device according to a first embodiment will be described below.

As illustrated in FIG. 1, the wheel bearing device 1 rotatably supports a vehicle wheel in a suspension system of a vehicle such as an automobile. The wheel bearing device 1 includes an outer wheel 2, a hub wheel 3, an inner wheel 4, two ball rows 5 that are rolling elements (see FIG. 2), an inner-side seal member 6, and an outer-side seal member 7.

As illustrated in FIG. 2, the outer wheel 2 that is an outer member supports the hub wheel 3 and the inner wheel 4. The outer wheel 2 is substantially tubular, and is made of medium-high carbon steel containing 0.40 to 0.80 wt % of carbon such as S53C. When the wheel bearing device 1 is mounted on a vehicle, the outer wheel 2 has one side end disposed on the inner-side that is the vehicle-side, and has the other side end disposed on the outer side that is the vehicle wheel-side (hereinafter, when the wheel bearing device 1 is mounted on the vehicle, the vehicle-side is referred to as "inner-side" and the vehicle wheel-side is referred to as "outer-side"). On an inner circumferential face of the outer wheel 2, annular outer rolling faces 2a are circumferentially formed on the inner-side and the outer-side so as to be parallel to each other. A quench-hardened layer subjected to induction quenching to have a surface hardness in the range of 58 to 64 HRC is formed on each of the outer rolling faces 2a, 2a. An inner-side opening 2b, to which the inner-side seal member 6 can be fitted, is formed at an inner-side end of the outer wheel 2. An outer-side opening 2c, to which the outer-side seal member 7 can be fitted, is formed at an outer-side end of the outer wheel 2. A vehicle body-attaching flange 2d for attachment to a knuckle of a suspension system (not illustrated) is integrally formed on an outer circumferential face of the outer wheel 2.

The hub wheel 3 that is a part of an inner member rotatably supports the vehicle wheel of a vehicle (not illustrated). The hub wheel 3 is shaped like a closed-end tube, and is made of medium-high carbon steel containing 0.40 to 0.80 wt % of carbon such as S53C. A narrowed stepped portion 3a is formed on an outer circumferential face at an inner-side end of the hub wheel 3. A vehicle wheel-attaching flange 3b for attaching the vehicle wheel is integrally formed at an outer-side end of the hub wheel 3 to expand into arc shape when viewed in an axial cross section. Hub bolts 3c are circumferentially provided at regular intervals on the vehicle wheel-attaching flange 3b (see FIG. 1). An annular inner rolling face 3d is circumferentially formed on the outer circumferential face on the outer side of the hub wheel 3.

The inner wheel 4 that is a part of the inner member is press-fitted to the narrowed stepped portion 3a at the inner-side end of the hub wheel 3. The inner member is configured of the hub wheel 3 and the inner wheel 4. The inner wheel 4 is made of high-carbon chromium bearing steel such as SUJ2, and is hardened up to a core portion to have a hardness in the range of 58 to 64 HRC by immersion quenching. An annular inner rolling face 4a is circumferentially formed on an outer circumferential face of the inner wheel 4. The inner wheel 4 is integrally fixed to the inner-side end of the hub wheel 3 in the state where the inner-side end of the hub wheel 3 is plastically deformed (swaged) toward the radial outer side, thereby applying a predetermined pre-load. That is, the inner wheel 4 constitutes the inner rolling face 4a on the inner side of the hub wheel 3. The hub wheel 3 is subjected to induction quenching from the narrowed stepped portion 3a on the inner-side to the inner rolling face 3d on the outer side to be hardened so as to have a surface hardness in the range of 58 to 64 HRC. Thereby, the hub wheel 3 has a sufficient mechanical strength against a rotary bending load applied to the vehicle wheel-attaching flange 3b, to improve the durability of the hub wheel 3. The swaged portion at the inner-side end remains to have the surface hardness after forging. The hub wheel 3 is disposed such that the inner rolling face 4a formed at the inner-side end of the inner wheel 4 is opposed to the outer rolling face 2a on the inner-side of the outer wheel 2, and the inner rolling face 3d formed at the outer side is opposed to the outer rolling face 2a on the outer side of the outer wheel 2.

The two ball rows 5 that are rolling elements rotatably support the hub wheel 3. In the two ball rows 5, a plurality of balls are annularly held in a holder. The two ball rows 5 are made of high-carbon chromium bearing steel such as SUJ2, and is hardened up to a core portion to have a hardness in the range of 58 to 64 HRC by immersion quenching. One ball row 5 of the two ball rows 5 is rollably sandwiched between the inner rolling face 4a formed on the inner wheel 4 and the opposed outer rolling face 2a of the outer wheel 2 on the inner side. The other ball row 5 of the two ball rows 5 is rollably sandwiched between the inner rolling face 3d formed on the hub wheel 3 and the opposed outer rolling face 2a of the outer wheel 2 on the outer side. That is, the two ball rows 5 rotatably support the hub wheel 3 and the inner wheel 4 with respect to the outer wheel 2. In this manner, in the wheel bearing device 1, the outer wheel 2, the hub wheel 3, the inner wheel 4, and the two ball rows 5 constitute a double-row angular ball bearing. In this embodiment, the wheel bearing device 1 constitutes the double-row angular ball bearing, however, the wheel bearing device 1 is not limited to this, and may be a double-row conical bearing.

The inner-side seal member 6 fills a gap between the outer wheel 2 and the inner wheel 4. The inner-side seal member 6 includes a substantially tubular seal plate 6a and a substantially tubular slinger 6b. The inner-side seal member 6 is formed by bonding a plurality of unilateral seal lips made of synthetic rubber such as elastic NBR (acrylonitrile-butadiene rubber) to the seal plate 6a formed of a ferritic stainless steel plate (such as SUS430 according to the JIS standard) by vulcanization. The slinger 6b is formed of the same steel plate as the seal plate 6a. In the inner-side seal member 6, the seal plate 6a is fitted to the inner-side opening 2b of the outer wheel 2, and the slinger 6b is fitted to the inner wheel 4 to constitute a pack seal. The unilateral seal lips of the seal plate 6a make contact with the slinger 6b via an oil film, resulting in that the inner-side seal member 6 can slide with respect to the slinger 6b. In this manner, the inner-side seal member 6 prevents lubricating grease from leaking from the inside of the outer wheel 2, and rainwater and dust from entering from the outside.

As illustrated in FIG. 3, the outer-side seal member 7 fills a gap between the outer-side opening 2c of the outer wheel 2 and the hub wheel 3. The outer-side seal member 7 is configured of a substantially tubular core metal 8 to which the plurality of seal lips are bonded by vulcanization, and a metallic ring 9.

The core metal 8 is formed of a ferritic stainless steel plate (such as SUS430 according to the JIS Standard), an austenite stainless steel plate (such as SUS304 according to the JIS Standard), or a rustproof cold-rolled steel plate (such as SPCC according to the JIS Standard). The core metal 8 is formed by bending a ring-shaped steel plate by pressing, and has a tubular portion 8a and a disc-like portion 8b which can be fitted to the outer-side opening 2c of the outer member.

A radial lip 8c, an inner axial lip 8d, and an outer axial lip 8e, each of which are ring-like, are integrally bonded to a plate face of the disc-like portion 8b of the core metal 8 by vulcanization. The radial lip 8c is formed at the innermost of the disc-like portion 8b in the radial direction. The inner axial lip 8d is formed outer than the radial lip 8c in the radial direction. The outer axial lip 8e is formed outer than the inner axial lip 8d in the radial direction. The radial lip 8c, the inner axial lip 8d, and the outer axial lip 8e are made of synthetic rubber such as NBR (acrylonitrile-butadiene rubber).

A ring-like outer member-side weir portion 8f is bonded to a side face of the core metal 8, which is not fitted to the outer-side opening 2c of the outer member (the side of the hub wheel 3), by vulcanization. The outer member-side weir portion 8f protrudes outer than the outer axial lip 8e in the radial direction. That is, the outer member-side weir portion 8f is formed as a tubular wall surrounding the radial lip 8c, the inner axial lip 8d, and the outer axial lip 8e. An outer member-side expanded portion 8g is formed on the inner circumferential face of the outer member-side weir portion 8f. The outer member-side expanded portion 8g is a ring-like groove expanded from the whole inner circumferential face of the outer member-side weir portion 8f with a predetermined width. In this embodiment, the outer member-side weir portion 8f is formed by bonding synthetic rubber to the core metal 8 by vulcanization. However, the present invention is not limited to this, and the core metal 8 may be bent.

The metallic ring 9 of the outer-side seal member 7 is formed of an austenite stainless steel plate (such as SUS304 according to the JIS Standard) or a rustproof cold-rolled steel plate (such as SPCC according to the JIS Standard). The metallic ring 9 is formed by bending a ring-like steel plate into tubular shape by pressing and expanding one end.

The metallic ring 9 is integrally configured of a tubular portion 9a that can be fitted to the inner member, a substantially arc-like curved portion 9b when viewed in an axial cross section, a radially-extending disc-like portion 9c, and a ring-like inner member-side weir portion 9d protruding toward the tubular portion. The tubular portion 9a is formed at one side end of the metallic ring 9. The curved portion 9b is adjacent to and connected to the tubular portion 9a. The disc-like portion 9c is adjacent to the curved portion 9b and is connected to the other side end of the metallic ring 9. An inner member-side weir portion 9d protrudes from the outer edge of the disc-like portion 9c toward the tubular portion 9a. In this embodiment, the inner member-side weir portion 9d is formed by bending the metallic ring 9. However, the present invention is not limited to this, and synthetic rubber may be bonded to the metal ring by vulcanization.

In the outer-side seal member 7, the tubular portion 8a of the core metal 8 is fitted to the outer-side opening 2c of the outer wheel 2. In the outer-side seal member 7, the tubular portion 9a of the metallic ring 9 is fitted to the hub wheel 3. Here, in the outer-side seal member 7, the seal lips integrally bonded to the core metal 8 by vulcanization are disposed such that the radial lip 8c is in contact with the tubular portion 9a of the metallic ring 9 via an oil film of grease, which is a lubricant, inner axial lip 8d is in contact with the curved portion 9b of the metallic ring 9 via an oil film of grease, and the outer axial lip 8e is in contact with the disc-like portion 9c of the metallic ring 9 via an oil film of grease. In the outer-side seal member 7, each of the seal lips is in contact with the metallic ring 9 via an oil film of grease so as to be slidable with respect to the metallic ring 9. The steel plate of the metallic ring 9 has a surface roughness Ra in the range of 0.2 to 0.6. In this manner, the outer-side seal member 7 ensures a good sliding state between each of the seal lips and the metallic ring 9, thereby preventing grease from leaking and rainwater and dust from entering through the outer-side opening 2c of the outer wheel 2.

In the outer-side seal member 7, the radial lip 8c, the inner axial lip 8d, and the outer axial lip 8e are disposed inner than the inner member-side weir portion 9d of the metallic ring 9 in the radial direction. That is, the inner member-side weir portion 9d is disposed as a tubular wall surrounding the radial lip 8c, the inner axial lip 8d, and the outer axial lip 8e. In the outer-side seal member 7, the inner member-side weir portion 9d is disposed on the inner side of the outer member-side weir portion 8f of the core metal 8. That is, the outer member-side weir portion 8f is disposed so as to surround the inner member-side weir portion 9d. Thus, the outer-side seal member 7 is configured such that a gap between the core metal 8 and a tip of the inner member-side weir portion 9d is not visible from the outside by the outer member-side weir portion 8f.

Further, the outer-side seal member 7 is configured such that the tip of the inner member-side weir portion 9d and the outer member-side expanded portion 8g of the outer member-side weir portion 8f overlap each other in the radial direction. That is, the outer-side seal member 7 is configured such that the inner member-side weir portion 9d allows grease that reached the inner member-side weir portion 9d to flow to the outer member-side expanded portion 8g. The outer member-side expanded portion 8g is formed to have a volume that can hold all grease applied to each of the seal lips (for example, 1.1 cm³ in the case where 1 g of grease having a density of 0.9 g/cm³ is applied). In this manner, in the outer-side seal member 7, the inner member-side weir portion 9d and the outer member-side weir portion 8f serve as barriers to prevent outflow and scattering of grease, and the outer member-side expanded portion 8g captures grease flown or scattered from the inner member-side weir portion 9d to prevent grease from flowing and scattering to the outside.

The wheel bearing device 1 thus configured constitutes a double-row angular ball bearing including the outer wheel 2, the hub wheel 3, the inner wheel 4, and the two ball rows 5, and the hub wheel 3 is rotatably supported by the outer wheel 2 via the two ball rows 5. In the wheel bearing device 1, the inner-side seal member 6 fills a gap between the outer wheel 2 and the inner wheel 4, and the outer-side seal member 7 fills a gap between the outer wheel 2 and the hub wheel 3 to prevent grease from leaking and water and dust from entering. In the wheel bearing device 1, the inner member-side weir portion 9d and the outer member-side weir portion 8f of the outer-side seal member 7 can suppress grease applied to each of the seal lips from flowing and scattering to the outside.

Next, with reference to FIGS. 4A and 4B, the actions of the outer-side seal member 7 will be described in detail. The viscosity of the grease gr filled in the wheel bearing device 1 lowers due to a temperature rise of the wheel bearing device 1, which is caused by the rotation of the hub wheel 3.

As illustrated in FIG. 4A, a centrifugal force of the hub wheel 3 acts to push the grease gr (gray portion) applied to each of the seal lips of the outer-side seal member 7 to the radial outer side. When the viscosity of the grease gr applied to the outer axial lip 8e of the outer-side seal member 7 lowers, a part of the grease gr moves along the metallic ring 9 toward the radial outer side of the metallic ring 9, and is received by the inner member-side weir portion 9d formed on the outer edge of the metallic ring 9 (see a black arrow).

As illustrated in FIG. 4B, when the amount of the grease gr received by the inner member-side weir portion 9d exceeds the limit, the grease gr flows from the inner member-side weir portion 9d toward the outer member-side weir portion 8f of the core metal 8 (see black arrows). The grease gr is guided by the inner member-side weir portion 9d to the outer member-side expanded portion 8g, which overlaps the tip of the inner member-side weir portion 9d in the radial direction. The grease gr flows into the outer member-side expanded portion 8g that is a groove, and is held therein. That is, even when flowing from the inner member-side weir portion 9d, the grease gr is captured by the outer member-side expanded portion 8g. The grease gr in the outer member-side expanded portion 8g is cooled via the outer member-side weir portion 8f that is in contact with outside air to increase its viscosity, making it difficult to flow out of the outer member-side expanded portion 8g.

In the wheel bearing device 1 thus configured, the inner member-side weir portion 9d provided on the metallic ring 9 of the outer-side seal member 7 functions as a barrier for interrupting the grease gr. Further, in the wheel bearing device 1, the core metal 8 is provided with the outer member-side weir portion 8f and the outer member-side expanded portion 8g, and the grease gr flowing from the inner member-side weir portion 9d is guided by the inner member-side weir portion 9d to the outer member-side expanded portion 8g. The wheel bearing device 1 captures the grease gr by the outer member-side expanded portion 8g. That is, in the wheel bearing device 1, the inner member-side weir portion 9d and the outer member-side weir portion 8f interrupt the grease gr flowing from the outer axial lip 8e and the like, and an outer member-side expanded portion 11g holds the grease gr so as to prevent the grease gr from moving from an outer member-side weir portion 11f toward the outside. This can suppress the grease gr applied to each of the seal lips from flowing and scattering to the outside.

The wheel bearing device 1 according to this embodiment is provided with the inner member-side weir portion 9*d* and the outer member-side weir portion 8*f*. However, in the following embodiments including the first embodiment, the weir portion may be provided only on the side of the outer member. Since an outer member-side weir portion 11*f* of the wheel bearing device 1 is provided at the outer wheel 2 that is the unrotating outer member, the outer member-side expanded portion 11*g* of the outer member-side weir portion 11*f* may hold the grease gr so as to prevent the grease gr from moving outward. The same applies to the following embodiments.

Next, with reference to FIG. 5, a wheel bearing device 10 that is a wheel bearing device according to a second embodiment will be described. It is given that the wheel bearing devices 1 illustrated in FIG. 1 to FIGS. 4A and 4B is replaced with the wheel bearing device 10 according to the following embodiment, and the same names, reference numerals, and signs used in the description refers to the same elements. The same points in the following embodiments as the points in the above-mentioned embodiments are not specifically described, and only differences will be mainly described.

As illustrated in FIG. 5, an outer-side seal member 7 fills a gap between the outer-side opening 2*c* of the outer wheel 2 and the hub wheel 3. The outer-side seal member 7 is configured of a substantially tubular core metal 11 bonded to a plurality of seal lips by vulcanization and the metallic ring 9.

A ring-like outer member-side weir portion 11*f* is integrally bonded to a side face of the core metal 11, which is not fitted to the outer-side opening 2*c* of the outer wheel 2 (the side of the hub wheel 3), by vulcanization. The outer member-side weir portion 11*f* protrudes outer than an outer axial lip 11*e* in the radial direction. That is, the outer member-side weir portion 11*f* is formed as a tubular wall surrounding the radial lip 11*c*, the inner axial lip 11*d*, and the outer axial lip 11*e*. The outer member-side expanded portion 11*g* is formed on the inner circumferential face of the outer member-side weir portion 11*f*. The outer member-side expanded portion 11*g* is a ring-like concave curved face curved on the whole inner circumferential face of the outer member-side weir portion 11*f* at a predetermined curvature when viewed in the axial cross section. That is, the whole inner circumferential face of the outer member-side weir portion 11*f* constitutes the outer member-side expanded portion 11*g*.

In the outer-side seal member 7, the outer member-side weir portion 11*f* integrally bonded to the core metal 11 by vulcanization is disposed so as to surround the inner member-side weir portion 9*d* of the metallic ring 9. That is, the outer-side seal member 7 is configured such that a gap between the core metal 11 and a tip of the inner member-side weir portion 9*d* is not visible from the outside. In this manner, in the outer-side seal member 7, the inner member-side weir portion 9*d* and the outer member-side weir portion 11*f* serve as barriers to prevent outflow and scattering of grease, and the outer member-side expanded portion 11*g* captures grease flown or scattered from the inner member-side weir portion 9*d* to prevent grease from flowing and scattering to the outside.

Next, with reference to FIG. 6, the actions of the outer-side seal member 7 will be described in detail.

As illustrated in FIG. 6, the grease gr flowing from the inner member-side weir portion 9*d* of the metallic ring 9 is guided by the inner member-side weir portion 9*d* to the outer member-side expanded portion 11*g* formed on the whole inner circumferential face of the outer member-side weir portion 11*f*. The grease gr is held in the outer member-side expanded portion 11*g* formed on the whole inner circumferential face of the outer member-side weir portion 11*f* (see black arrows). That is, the grease gr is captured by the outer member-side expanded portion 11*g* even if the grease gr is guided from the inner member-side weir portion 9*d* to any location on the inner circumferential face of the outer member-side weir portion 11*f*.

In the wheel bearing device 10 thus configured, the inner member-side weir portion 9*d* merely guides the grease gr to any location on the outer member-side weir portion 11*f*, thereby causing the outer member-side expanded portion 11*g* to capture the grease gr. That is, in the wheel bearing device 10, the inner member-side weir portion 9*d* and the outer member-side weir portion 11*f* interrupt the grease gr flowing from the outer axial lip 11*e* and the like, and the outer member-side expanded portion 11*g* holds the grease gr so as to prevent the grease gr from moving from the outer member-side weir portion 8*f* to the outside. This can suppress the grease gr applied to each of the seal lips from flowing and scattering to the outside.

Next, with reference to FIG. 7, a wheel bearing device 12 that is a wheel bearing device according to a third embodiment will be described.

As illustrated in FIG. 7, an outer-side seal member 7 fills a gap between the outer-side opening 2*c* of the outer wheel 2 and the hub wheel 3. The outer-side seal member 7 is configured of a substantially tubular core metal 13 bonded to a plurality of seal lips by vulcanization and the metallic ring 9.

A ring-like outer member-side weir portion 13*f* is integrally bonded to a side face of the core metal 13, which is not fitted to the outer-side opening 2*c* of the outer wheel 2 (the side of the hub wheel 3), by vulcanization. The outer member-side weir portion 13*f* protrudes outer than an outer axial lip 13*e* in the radial direction. That is, the outer member-side weir portion 13*f* is formed as a tubular wall surrounding a radial lip 13*c*, an inner axial lip 13*d*, and an outer axial lip 13*e*. An outer member-side expanded portion 13*g* is formed on an inner circumferential face of the outer member-side weir portion 13*f*. The outer member-side expanded portion 13*g* is constituted of an inversely-tapered inner circumferential face formed by reducing (narrowing) the inner diameter of the outer member-side weir portion 13*f* toward a tip of the outer member-side weir portion 13*f*. That is, the whole inner circumferential face of the outer member-side weir portion 13*f* constitutes the outer member-side expanded portion 13*g*.

In the outer-side seal member 7, the outer member-side weir portion 13*f* integrally bonded to the core metal 13 by vulcanization is disposed so as to surround the inner member-side weir portion 9*d* of the metallic ring 9. That is, the outer-side seal member 7 is configured such that a gap between the core metal 13 and a tip of the inner member-side weir portion 9*d* is not visible from the outside. In this manner, in the outer-side seal member 7, the inner member-side weir portion 9*d* and the outer member-side weir portion 13*f* serve as barriers to prevent outflow and scattering of grease gr, and the outer member-side expanded portion 13*g* captures grease gr flown or scattered from the inner member-side weir portion 9*d* to prevent grease gr from flowing and scattering to the outside.

Next, with reference to FIG. 8, the actions of the outer-side seal member 7 will be described in detail.

As illustrated in FIG. 8, the grease gr flowing from the inner member-side weir portion 9d of the metallic ring 9 toward the outer member-side weir portion 13f of the core metal 13 is guided by the inner member-side weir portion 9d to the inner circumferential face of the outer member-side weir portion 13f. The grease gr is held by the outer member-side expanded portion 13g formed on the whole inner circumferential face of the outer member-side weir portion 13f. That is, the grease gr is captured by the outer member-side expanded portion 13g even if the grease gr flows from the inner member-side weir portion 9d to any location on the inner circumferential face of the outer member-side weir portion 13f.

In the wheel bearing device 12 thus configured, the inner member-side weir portion 9d merely guides the grease gr to any location on the outer member-side weir portion 13f, thereby causing the outer member-side expanded portion 13g to capture the grease gr and prevents the grease gr from moving outward. This can suppress the grease gr applied to each of the seal lips from flowing and scattering to the outside.

Next, with reference to FIG. 9, a wheel bearing device 14 that is a wheel bearing device according to a fourth embodiment will be described.

As illustrated in FIG. 9, an outer wheel 15 that is an outer member supports the hub wheel 3 and the inner wheel 4. The outer wheel 15 is substantially tubular. An outer-side opening 15c that can be fitted to the outer-side seal member 7 is formed at the outer-side end of the outer wheel 15. A ring-like outer member-side weir portion 15e is integrally formed at the outer-side end of the outer wheel 15. The outer member-side weir portion 15e protrudes toward the hub wheel 3 on the outer side of the inner member-side weir portion 9d of the metallic ring 9 in the radial direction. That is, the outer member-side weir portion 15e is formed as a tubular wall surrounding the outer-side seal member 7 fitted to the outer-side opening 15c. An outer member-side expanded portion 15f is formed on an inner circumferential face of the outer member-side weir portion 15e. The outer member-side expanded portion 15f is a ring-like groove expanded from the whole inner circumferential face of the outer member-side weir portion 15e with a predetermined width. In this embodiment, the outer member-side expanded portion 15f is formed as a ring-like groove expanded with a predetermined width from the whole inner circumferential face of the outer member-side weir portion 15e. However, the present invention is not limited to this, and the inner circumferential face may be a concave curved face or an inversely-tapered face.

An outer-side seal member 7 fills a gap between the outer-side opening 2c of the outer wheel 2 and the hub wheel 4. The outer-side seal member 7 is configured of a substantially tubular core metal 16 bonded to a plurality of seal lips by vulcanization and the metallic ring 9.

The core metal 16 is formed by bending a ring-like steel plate by pressing, and includes a tubular portion 16a that is fitted to the outer-side opening 15c of the outer member and a disc-like portion 16b. A ring-like radial lip 16c, an inner axial lip 16d, and an outer axial lip 16e are integrally bonded to a plate face of the disc-like portion 16b by vulcanization. The radial lip 16c is formed at the innermost of the core metal 16 in the radial direction. The inner axial lip 16d is formed outer than the radial lip 16c in the radial direction. The outer axial lip 16e is formed outer than the inner axial lip 16d in the radial direction.

In the outer-side seal member 7, the tubular portion 16a of the core metal 16 is fitted to the outer-side opening 15c of the outer wheel 15. In the outer-side seal member 7, the tubular portion 9a of the metallic ring 9 is fitted to the hub wheel 3. In the outer-side seal member 7, the radial lip 16c, the inner axial lip 16d, and the outer axial lip 16e are disposed inner than the inner member-side weir portion 9d of the metallic ring 9 in the radial direction. That is, the inner member-side weir portion 9d is disposed as a tubular wall surrounding the radial lip 16c, the inner axial lip 16d, and the outer axial lip 16e. The outer-side seal member 7 is disposed inner than the outer member-side weir portion 15e of the outer wheel 15 in the radial direction. That is, in the outer-side seal member 7, the inner member-side weir portion 9d is covered with the outer member-side weir portion 15e. Thus, the outer-side seal member 7 is configured such that a gap between a tip of the inner member-side weir portion 9d and the core metal 16 is not visible from the outside by the outer member-side weir portion 15e. The outer-side seal member 7 is disposed such that the tip of the inner member-side weir portion 9d and an outer member-side expanded portion 15f of the outer member-side weir portion 15e overlap each other in the radial direction. That is, in the outer-side seal member 7, grease flowing from the inner member-side weir portion 9d is guided by the inner member-side weir portion 9d to the outer member-side expanded portion 15f.

In the wheel bearing device 14 thus configured, the inner member-side weir portion 9d guides grease to the outer member-side expanded portion 15f of the outer wheel 15, thereby causing the outer member-side expanded portion 15f to capture grease and prevent the grease from moving outward. This can suppress the grease applied to each of the seal lips from flowing and scattering to the outside.

As illustrated in FIG. 10, in a wheel bearing device 17 as a modification of the wheel bearing devices 1, 10, 12, and 14 according to the first to fourth embodiments (FIG. 10 illustrates a modification of the wheel bearing device 14), an inner member-side expanded portion 18e may be also formed on an inner member-side weir portion 18d of the outer-side seal member 7. That is, in the wheel bearing devices 1, 10, 12, and 14 according to the first to the fourth embodiments, an expanded portion for capturing and holding grease may be formed at at least one of the outer member-side weir portion and the inner member-side weir portion.

As illustrated in FIG. 11, in a wheel bearing device 19 as a modification of the wheel bearing devices 1, 10, 12, and 14 according to the first to fourth embodiments (FIG. 11 illustrates a modification of the wheel bearing device 14), an inner circumferential face 20e of an inner member-side weir portion 20d in an outer-side seal member 7 may be expanded toward a tip of the inner member-side weir portion 20d such that grease may easily flow into the outer member-side expanded portion 13g.

The wheel bearing devices 1, 10, 12, 14, 17, and 19 according to the embodiments are each described as the third generation wheel bearing device in which the inner rolling face 3d of the ball row 5 is formed directly on the outer circumference of the hub wheel 3. However, the present invention is not limited to this, and the wheel bearing device may be a second generation wheel bearing device of inner wheel-rotating type in which a pair of inner wheels 4 are fitted to the hub wheel 3. The above-mentioned embodiments are merely typical embodiments of the present invention, and may be variously modified and implemented so as not to deviate from the subject matter of the present invention.

INDUSTRIAL APPLICABILITY

The present invention can be applied to the wheel bearing device.

REFERENCE SIGNS LIST

1 Wheel bearing device
2 Outer wheel
2a Outer rolling face
3 Hub wheel
3a Narrowed stepped portion
4 Inner wheel
4a Inner rolling face
5 Ball row
7 Outer-side seal member
8 Core metal
8f Outer member-side weir portion
8g Outer member-side expanded portion
9 Metallic ring
9d Inner member-side weir portion
11f Outer member-side weir portion
gr Grease

The invention claimed is:

1. A wheel bearing device comprising:
an outer member integrally provided with double-row outer rolling faces on an inner circumference of the outer member;
an inner member including a hub wheel provided with an axially-extending narrowed stepped portion on an outer circumference of the hub wheel and at least one inner wheel press-fitted into the narrowed stepped portion, the inner member having double-row inner rolling faces opposed to the double-row outer rolling faces on an outer circumference of the inner member;
double-row rolling elements rollably accommodated between the inner rolling faces and the outer rolling faces; and
a seal member for sealing a space between the outer member and the inner member by fitting a core metal to an opening of the outer member, fitting a metallic ring to the outer circumference of the inner member so as to be opposed to the core metal, the core metal being provided with an elastic seal lip, and causing the metallic ring to contact the seal lip,
wherein a ring shaped outer member-side weir portion protruding further than an outer edge of the metallic ring in a radial outward direction to surround the metallic ring is provided with the core metal, and
an outer member-side expanded portion for holding a lubricant is formed on an inner circumferential face of the outer member-side weir portion.

2. The wheel bearing device according to claim 1, wherein the metallic ring is provided with a ring shaped inner member-side weir portion protruding toward the outer member on a radial outer side of a contact position between the metallic ring and the seal lip.

3. The wheel bearing device according to claim 1, wherein the metallic ring is provided with a ring shaped inner member-side weir portion protruding toward the outer member on a radial outer side of a contact position between the metallic ring and the seal lip, and
wherein an inner member-side expanded portion for holding the lubricant is formed on an inner circumferential face of the inner member-side weir portion.

4. The wheel bearing device according to claim 1, wherein the metallic ring is provided with a ring shaped inner member-side weir portion protruding toward the outer member on a radial outer side of a contact position between the metallic ring and the seal lip, and
wherein a tip of the inner member-side weir portion and the outer member-side expanded portion overlap each other in the radial direction.

5. The wheel bearing device according to claim 1, wherein the metallic ring is provided with a ring shaped inner member-side weir portion protruding toward the outer member on a radial outer side of a contact position between the metallic ring and the seal lip,
wherein a tip of the inner member-side weir portion and the outer member-side expanded portion overlap each other in the radial direction, and
wherein at least one of the outer member-side expanded portion and the inner member-side expanded portion is formed in a ring like ring shaped groove.

6. The wheel bearing device according to claim 1, wherein the metallic ring is provided with a ring shaped inner member-side weir portion protruding toward the outer member on a radial outer side of a contact position between the metallic ring and the seal lip,
wherein a tip of the inner member-side weir portion and the outer member-side expanded portion overlap each other in the radial direction, and
wherein at least one of the outer member-side expanded portion and the inner member-side expanded portion is formed on a ring like ring shaped concave curved face.

7. The wheel bearing device according to claim 1, wherein the metallic ring is provided with a ring shaped inner member-side weir portion protruding toward the outer member on a radial outer side of a contact position between the metallic ring and the seal lip,
wherein a tip of the inner member-side weir portion and the outer member-side expanded portion overlap each other in the radial direction, and
wherein an inner diameter of at least one of the outer member-side weir portion and the inner member-side weir portion is gradually reduced toward the tip.

8. A wheel bearing device comprising:
an outer member integrally provided with double-row outer rolling faces on an inner circumference of the outer member;
an inner member including a hub wheel provided with an axially-extending narrowed stepped portion on an outer circumference of the hub wheel and at least one inner wheel press-fitted into the narrowed stepped portion, the inner member having double-row inner rolling faces opposed to the double-row outer rolling faces on an outer circumference of the inner member;
double-row rolling elements rollably accommodated between the inner rolling faces and the outer rolling faces; and
a seal member for sealing a space between the outer member and the inner member by fitting a core metal to an opening of the outer member, fitting a metallic ring to the outer circumference of the inner member so as to be opposed to the core metal, the core metal being provided with an elastic seal lip, and causing the metallic ring to contact the seal lip,
wherein a ring shaped outer member-side weir portion protruding further than an outer edge of the metallic ring in a radial outward direction to surround the metallic ring is provided with the outer member, and
an outer member-side expanded portion for holding a lubricant is formed on an inner circumferential face of the outer member-side weir portion.

9. The wheel bearing device according to claim 8, wherein the metallic ring is provided with a ring shaped inner member-side weir portion protruding toward the outer member on a radial outer side of a contact position between the metallic ring and the seal lip.

10. The wheel bearing device according to claim 8, wherein the metallic ring is provided with a ring shaped inner member-side weir portion protruding toward the outer member on a radial outer side of a contact position between the metallic ring and the seal lip, and wherein an inner member-side expanded portion for holding the lubricant is formed on an inner circumferential face of the inner member-side weir portion.

11. The wheel bearing device according to claim 8, wherein the metallic ring is provided with a ring shaped inner member-side weir portion protruding toward the outer member on a radial outer side of a contact position between the metallic ring and the seal lip, and wherein a tip of the inner member-side weir portion and the outer member-side expanded portion overlap each other in the radial direction.

12. The wheel bearing device according to claim 8, wherein the metallic ring is provided with a ring shaped inner member-side weir portion protruding toward the outer member on a radial outer side of a contact position between the metallic ring and the seal lip, wherein a tip of the inner member-side weir portion and the outer member-side expanded portion overlap each other in the radial direction, and wherein at least one of the outer member-side expanded portion and the inner member-side expanded portion is formed in a ring shaped groove.

13. The wheel bearing device according to claim 8, wherein the metallic ring is provided with a ring shaped inner member-side weir portion protruding toward the outer member on a radial outer side of a contact position between the metallic ring and the seal lip, wherein a tip of the inner member-side weir portion and the outer member-side expanded portion overlap each other in the radial direction, and wherein at least one of the outer member-side expanded portion and the inner member-side expanded portion is formed on a ring shaped concave curved face.

14. The wheel bearing device according to claim 8, wherein the metallic ring is provided with a ring shaped inner member-side weir portion protruding toward the outer member on a radial outer side of a contact position between the metallic ring and the seal lip, wherein a tip of the inner member-side weir portion and the outer member-side expanded portion overlap each other in the radial direction, and wherein an inner diameter of at least one of the outer member-side weir portion and the inner member-side weir portion is gradually reduced toward the tip.

* * * * *